US012374250B2

United States Patent

Pyo

(10) Patent No.: US 12,374,250 B2
(45) Date of Patent: Jul. 29, 2025

(54) DISPLAY DEVICE FOR SETTING MARGIN VOLTAGE AND METHOD FOR OPERATING THE SAME

(71) Applicant: Samsung Display Co., Ltd., Yongin-Si (KR)

(72) Inventor: Si Beak Pyo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/645,829

(22) Filed: Apr. 25, 2024

(65) Prior Publication Data

US 2025/0078702 A1 Mar. 6, 2025

(30) Foreign Application Priority Data

Sep. 4, 2023 (KR) ........................ 10-2023-0117051

(51) Int. Cl.
*G09G 3/00* (2006.01)
*G09G 3/3225* (2016.01)

(52) U.S. Cl.
CPC ........... *G09G 3/006* (2013.01); *G09G 3/3225* (2013.01); *G09G 2320/0233* (2013.01); *G09G 2320/0242* (2013.01); *G09G 2330/12* (2013.01)

(58) Field of Classification Search
CPC ................. G09G 3/006; G09G 3/3225; G09G 2320/0233; G09G 2320/0242; G09G 2330/12
See application file for complete search history.

(56) References Cited

U.S. PATENT DOCUMENTS

| | | | | |
|---|---|---|---|---|
| 10,553,146 B2 | 2/2020 | Pyo et al. | | |
| 10,714,021 B2 | 7/2020 | Pyo et al. | | |
| 10,810,934 B2 | 10/2020 | Pyo et al. | | |
| 10,997,909 B2 | 5/2021 | Pyo et al. | | |
| 11,302,238 B2 | 4/2022 | Pyo et al. | | |
| 2019/0130827 A1* | 5/2019 | Pyo | ...................... | G09G 3/3233 |
| 2019/0311682 A1* | 10/2019 | Pyo | ...................... | G09G 3/3233 |

FOREIGN PATENT DOCUMENTS

| | | |
|---|---|---|
| KR | 10-2480483 B1 | 12/2022 |
| KR | 10-2537993 B1 | 6/2023 |

* cited by examiner

*Primary Examiner* — Hang Lin
(74) *Attorney, Agent, or Firm* — Innovation Counsel LLP

(57) ABSTRACT

The display device includes a display unit including pixels displaying first to third colors, a data driver that supplies a plurality of test voltages to the pixels in the display unit through data lines to display test images through the display unit, and a margin voltage setting unit that determines a dominant color based on test images displayed on the display unit and individually sets margin voltages corresponding to the first to third colors based on the dominant color.

20 Claims, 6 Drawing Sheets

FIG. 4

| Test voltage | Voltage[V] | Ti_L[Nits] | CC | | Region | Weight | Decision value |
|---|---|---|---|---|---|---|---|
| | | | x | y | | | |
| V1 | 5.9 | 0.0507 | 0.5110 | 0.4674 | D | 0.1 | 0.1 |
| V2 | 5.8 | 0.0085 | 0.5999 | 0.3839 | G | 0.2 | 0.9 |
| V3 | 5.7 | 0.0021 | 0.6314 | 0.3719 | G | 0.3 | |
| V4 | 5.6 | 0.0009 | 0.5662 | 0.3349 | G | 0.3 | |
| V5 | 5.5 | 0.0005 | 0.5064 | 0.2874 | G | 0.1 | |

DISPLAY DEVICE FOR SETTING MARGIN VOLTAGE AND METHOD FOR OPERATING THE SAME

CROSS-REFERENCE TO RELATED APPLICATION

This application claims priority to and the benefit of Korean Patent Application No. 10-2023-0117051 filed in the Korean Intellectual Property Office on Sep. 4, 2023, the entire contents of which are incorporated herein by reference.

BACKGROUND

1. Field

The present inventive concept relates to a display device for setting a margin voltage and a method of operating the same.

2. Description of the Related Art

In general, the same black data is set for display devices manufactured through the same process, and the black data is set based on the sample and driving conditions with the worst characteristics.

To prevent a situation where a black image is not displayed due to a change in the power voltage of the display device depending on the temperature, a margin voltage can be added to the voltage that sets black data. Adding the margin voltage causes a problem in that power consumption of the display device increases.

SUMMARY

The technical problem to be solved is to provide a display device that can reduce power consumption and a method of operating the same by setting a margin voltage applied when setting black data for each color.

A display device according to an embodiment of the present inventive concept includes a display unit including pixels displaying first to third colors, a data driver that supplies a plurality of test voltages to the pixels in the display unit through data lines to display test images through the display unit, and a margin voltage setting unit that determines a dominant color based on test images displayed on the display unit and individually sets margin voltages corresponding to the first to third colors based on the dominant color.

The margin voltage setting unit may set only the margin voltage of the first color when the dominant color is the first color, may set only the margin voltage of the second color when the dominant color is the second color, and may set only the margin voltage of the third color when the dominant color is the third color.

The margin voltage setting unit may determine color regions corresponding to the plurality of test voltages among a plurality of color regions, may generate decision values corresponding to the plurality of color regions respectively based on the determined color regions, and may determine the dominant color based on a color region with a largest decision value among the decision values.

The margin voltage setting unit may set a weight for each of the plurality of test voltages and may generate the decision values by summing the weights of the test voltages disposed in each of the plurality of color regions.

The margin voltage setting unit may set a weight for each of the plurality of test voltages and may set a largest weight for a reference voltage among the plurality of test voltages.

The margin voltage setting unit may set a larger weight as a difference between each of the plurality of test voltages and a reference voltage becomes smaller.

The margin voltage setting unit may set a test voltage having a luminance value closest to reference luminance as the reference voltage.

The margin voltage setting unit may set a same weight for each of the plurality of test voltages.

The plurality of color regions may be regions in a CIE 1931 color coordinate system.

Each of the plurality of test voltages may be a voltage set to display a black image on the display device.

A method of operating a display device including pixels displaying first to third colors includes displaying test images through the pixels by supplying a plurality of test voltages to the pixels; determining color regions respectively corresponding to a plurality of test voltages among a plurality of color regions depending on the test images; generating decision values corresponding to the plurality of color regions respectively based on the determined color regions; determining a dominant color based on a color region having a largest decision value among the decision values; and setting a margin voltage based on the dominant color.

The setting the margin voltage based on the dominant color may include setting each of a margin voltage of the first color, a margin voltage of the second color, and a margin voltage of the third color based on the dominant color.

When the dominant color is the first color, only the margin voltage of the first color may be set; when the dominant color is the second color, only the margin voltage of the second color may be set, and, when the dominant color is the third color, only the margin voltage of the third color may be set.

The generating the decision values corresponding to the plurality of color regions respectively may include setting a weight for each of the plurality of test voltages; and summing weights of test voltages disposed in each of the plurality of color regions.

The setting the weight for each of the plurality of test voltages may include setting a weight for each of the plurality of test voltages.

The setting the different weight for each of the plurality of test voltages may include setting a larger weight as a difference between each of the plurality of test voltages and a reference voltage is smaller.

The method may further include receiving luminance values corresponding to the plurality of test voltages respectively, and setting a test voltage having a luminance value closest to reference luminance among the luminance values as the reference voltage.

The setting the weight for each of the plurality of test voltages may include setting a same weight for each of the plurality of test voltages.

The plurality of color regions may be regions in a CIE 1931 color coordinate system.

Each of the plurality of test voltages may be a voltage set to display a black image on the display device.

According to a display device and a method of operating the same of the present inventive concept, the display device can reduce power consumption by setting a margin voltage applied when setting black data for each color.

BRIEF DESCRIPTION OF THE DRAWINGS

FIG. 4 is a table illustrating factors determined by a dominant color determination unit according to an embodiment of the present inventive concept.

DETAILED DESCRIPTION OF THE EMBODIMENTS

Figure 1:
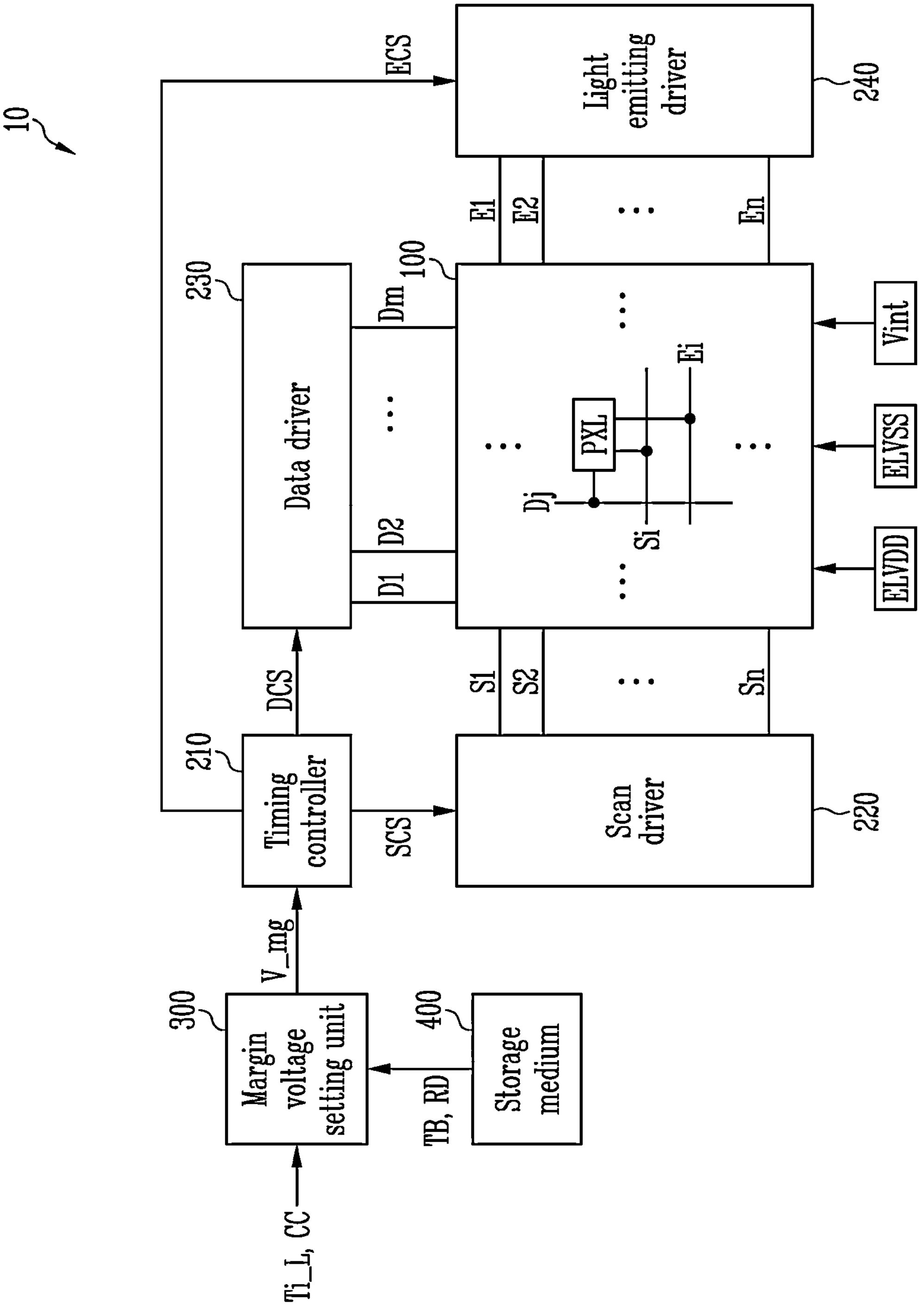
FIG. 1 is a diagram showing a display device according to an embodiment of the present inventive concept.

Hereinafter, with reference to accompanying drawings, various exemplary embodiments of the present inventive concept will be described in detail so that those skilled in the art can easily carry out the present inventive concept. The present inventive concept may be implemented in many different forms and is not limited to embodiments described below.

In order to clarify the present inventive concept, parts not related to the description are omitted from the drawings, and the same reference numbers are used throughout the drawings to refer to the same or like parts.

Additionally, terms such as “unit” and “module” used below or functional blocks shown in the drawings may be implemented in the form of software configuration, hardware configuration, or a combination thereof. In order to clearly explain the technical idea of the present disclosure, detailed descriptions of overlapping components are omitted.

FIG. 1 is a diagram showing a display device according to an embodiment of the present inventive concept.

Referring to FIG. 1, the display device 10 according to an embodiment of the present inventive concept includes a display unit 100, a timing controller 210, a scan driver 220, a data driver 230, a light emitting driver 240, a margin voltage setting unit 300 and a storage medium 400.

The timing controller 210 may generate a scan driving control signal SCS, a data driving control signal DCS, and a light emitting driving control signal ECS based on signals input from the outside. The timing controller 210 may provide the scan driving control signal SCS to the scan driver 220, may provide the data driving control signal DCS to the data driver 230, and may provide the light emitting driving control signal ECS to the light emitting driver 240.

The scan driver 220 may generate scan signals to be provided to scan lines S1 to Sn based on the scan driving control signal SCS, where n is an integer greater than zero. For example, the scan driver 220 may be configured in the form of a shift register, and may generate scan signals in response to the scan driving control signal SCS.

When the scan signals are sequentially supplied to the scan lines S1 to Sn, pixels PXL may be selected one horizontal line at a time. To this end, the scan signal may be set to a gate-on voltage (e.g., low-level voltage in a PMOS) so that the transistors included in the pixels PXL can be turned on.

The data driver 230 may generate data voltages to be provided to data lines D1 to Dm in response to the data driving control signal DCS, where m may be an integer greater than zero. Data voltages supplied to data lines D1 to Dm may be supplied to the pixels PXL selected by the scan signal.

The data voltages may include grayscale voltages for pixels of a first color, grayscale voltages for pixels of a second color, and grayscale voltages for pixels of a third color. For example, the first color may be red, the second color may be green, and the third color may be blue.

The light emitting driver 240 may generate a light emitting control signal to be provided to the light emitting control lines E1 to En based on the light emitting driving control signal ECS. In one embodiment, the light emitting driver 240 may sequentially supply light emitting control signals to the light emitting control lines E1 to En.

When the light emitting control signal is sequentially supplied to the light emitting control lines E1 to En, the pixels PXL connected to the light emitting control line which receives the light emitting control signal may not emit light. To this end, the light emitting control signal may be set to a gate-off voltage (e.g., high-level voltage) so that transistors included in the pixels PXL can be turned off.

Meanwhile, in FIG. 1, the scan driver 220 and the light emitting driver 240 are shown as separate constituent, but the present inventive concept is not limited thereto. For example, the scan driver 220 and the light emitting driver 240 may be formed as one driver.

Additionally, the scan driver 220 and/or the light emitting driver 240 may be formed on a substrate through a thin film process. Additionally, the scan driver 220 and/or the light emitting driver 240 may be disposed on both sides with the display unit 100 interposed therebetween.

The display unit 100 may include a plurality of pixels PXL connected to data lines D1 to Dm, scan lines S1 to Sn, and light emitting control lines E1 to En. The pixels PXL may receive an initialization power Vint, a first power ELVDD, and a second power ELVSS from outside of the display unit 100.

The display unit 100 may include pixels that emit light of the first color, pixels that emit light of the second color, and pixels that emit light of the third color. For example, the first color may be red, the second color may be green, and the third color may be blue, and magenta, cyan, and yellow may be used as the first to third colors instead of red, green, and blue. However, in one embodiment of the present inventive concept, red, green, and blue are used as the first to third colors for convenience of description, it is illustrated as magenta is a combination of red and blue, cyan is a combination of green and blue, and yellow is a combination of red and green.

The pixels PXL may receive data voltages from the data lines D1 to Dm when the scan signal is supplied to the scan lines S1 to Sn. The pixel PXL receiving the data voltage may control the amount of current flowing from the first power ELVDD to the second power ELVSS via an organic light emitting diode (not shown) according to the data voltage. The first power ELVDD may be set to a higher voltage than the second power ELVSS.

In FIG. 1, the pixel PXL is shown as being connected to one scan line Si, one data line Dj, and one light emitting control line Ei, but the present inventive concept is not limited thereto. For example, a plurality of scan lines and a plurality of light emitting control lines may be connected to the pixel PXL corresponding to the circuit structure of the pixel PXL.

The margin voltage setting unit 300 may analyze a dominant color of a black image displayed on the display device 10 to set a magnitude of a margin voltage. The margin voltage may be a voltage added to the data voltage to stably display the black image even when the display device 10 is affected by the surrounding environment. The dominant color may be the main color that constitutes the black image.

The margin voltage setting unit 300 may determine the dominant color based on the luminance value Ti_L and color coordinates CC of the image displayed on the display device 10.

The margin voltage may include a margin voltage for pixels of the first color, a margin voltage for pixels of the second color, and a margin voltage for pixels of the third color. The margin voltage setting unit 300 may individually set the magnitude of the margin voltage for each of the pixels of the first color, the pixels of second color, and the pixels of the third color depending on the color of the dominant color of the black image.

The margin voltage setting unit 300 may supply a set margin voltage data V_mg to the timing controller 210. The margin voltage setting unit 300 may be disposed in front of the timing controller 210, as shown in FIG. 1. In this case, the margin voltage setting unit 300 may be included in a host system (not shown) that generates a plurality of clock signals and outputs them to the timing controller 210. However, the present inventive concept is not limited thereto, and the margin voltage setting unit 300 may be formed as a separate constituent from the host system.

Alternatively, the margin voltage setting unit 300 may be disposed between the timing controller 210 and the data driver 230 or may be included within the timing controller 210.

The storage medium 400 may include a margin voltage table TB and region data RD. The margin voltage table TB may include the magnitude of the margin voltage set for each of the first to third color pixels depending on the dominant color. The region data RD may include a color coordinate that defines each of the color regions for determining the dominant color. For example, the region data RD may be the color coordinate that defines each of distinct regions in the CIE 1931 color coordinate system.

The margin voltage setting unit 300 may set the margin voltage for each of the pixels of the first to third colors based on the margin voltage table TB and the dominant color stored in the storage medium 400.

Figure 2:
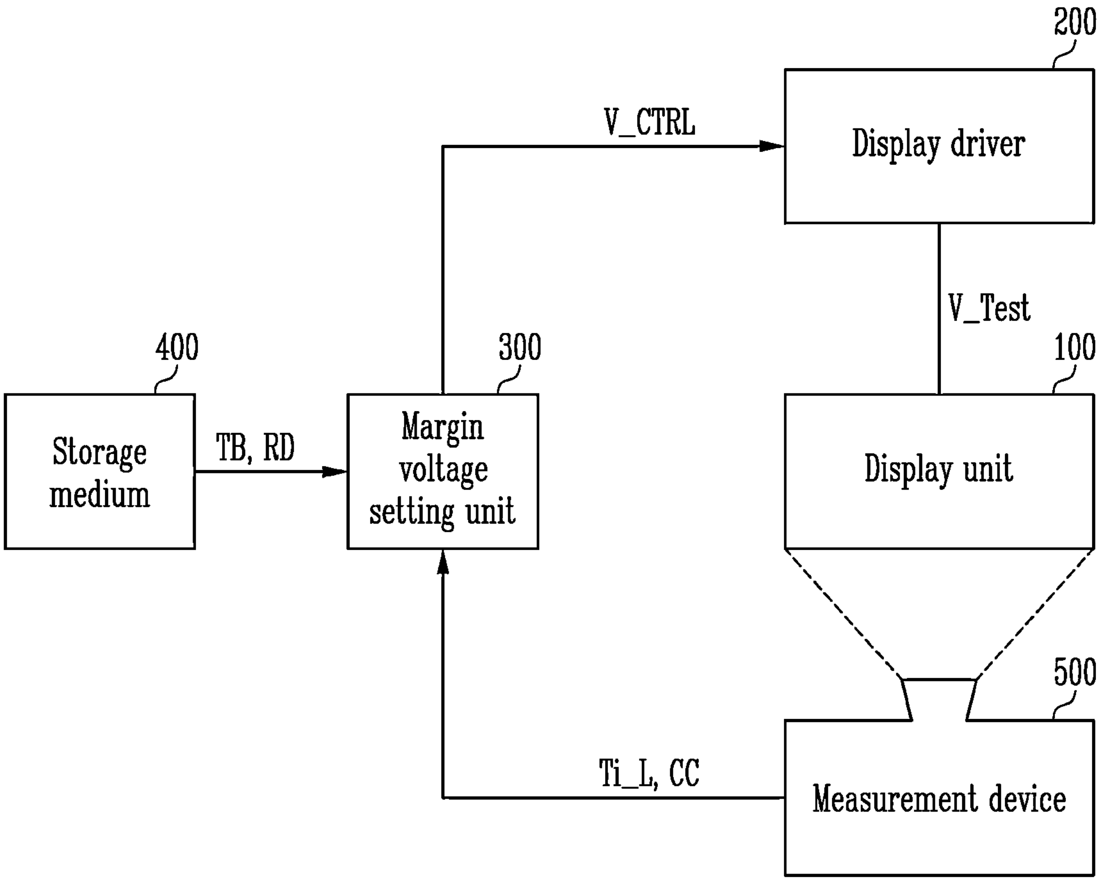
FIG. 2 is a diagram schematically showing a configuration of a margin voltage setting system according to an embodiment of the present inventive concept.

FIG. 2 is a diagram schematically showing a configuration of a margin voltage setting system according to an embodiment of the present inventive concept.

Referring to FIGS. 1 and 2, the margin voltage setting system may include a display unit 100, a display driver 200, a margin voltage setting unit 300, a storage medium 400, and a measurement device 500.

Here, the display unit 100, the display driver 200, and the margin voltage setting unit 300 may constitute the display device 10 shown in FIG. 1. Additionally, the display driver 200 may include a timing controller 210, a scan driver 220, a data driver 230, and a light emitting driver 240 shown in FIG. 1.

When a test voltage V_Test is applied to the display unit 100 and a test image is displayed, the measurement device 500, for example, a photometer, can measure a luminance value Ti_L for the test image. The margin voltage setting unit 300 may transmit a voltage control signal V_CTRL to the display driver 200, for example, the timing controller 210 of FIG. 1. For example, the voltage control signal V_CTRL may control the magnitude of the test voltage V_Test.

The display driver 200 may apply the test voltage V_Test to the display unit 100 according to the voltage control signal V_CTRL. For example, the display driver 200 may apply the test voltage V_Test through the data lines D1 to Dm while supplying the scan signal to the scan lines S1 to Sn, and thus the display unit 100 can display the test image.

The measurement device 500 may determine the luminance value Ti_L from the displayed test image and may transmit the determined luminance value Ti_L to the margin voltage setting unit 300. Additionally, the measurement device 500 may calculate the color coordinates CC from the displayed test image and transmit the calculated color coordinates CC to the margin voltage setting unit 300. The color coordinates CC may be coordinates in the CIE 1931 color coordinate system that match the test image displayed by the test voltage V_Test.

The margin voltage setting unit 300 may be connected to the measurement device 500 and may obtain the luminance value Ti_L of the test image and the color coordinates CC from the measurement device 500. For example, the margin voltage setting unit 300 may be temporarily connected to the measurement device 500 during the manufacturing process of the display device 10 or may be temporarily connected to the measurement device 500 after the manufacturing process of the display device 10 is completed. When the margin voltage setting unit 300 sets the magnitude of the margin voltage, the display device 10 may be separated from the measurement device 500.

Although the margin voltage setting unit 300, the storage medium 400, and the measurement device 500 are shown as separate constituent of the margin voltage setting system, the present inventive concept is not limited thereto. For example, the margin voltage setting unit 300, the storage medium 400, and the measurement device 500 may be configured as one driver or one device.

Figure 3:
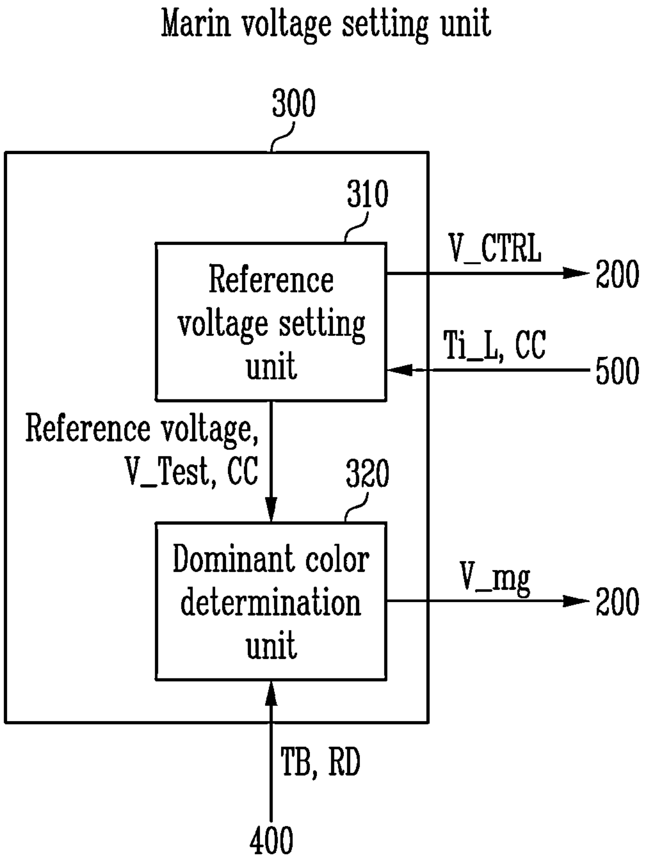
FIG. 3 is a block diagram showing a margin voltage setting unit according to an embodiment of the present inventive concept.

FIG. 3 is a block diagram showing a margin voltage setting unit according to an embodiment of the present inventive concept.

Referring to FIGS. 2 and 3, the margin voltage setting unit 300 may include a reference voltage setting unit 310 and a dominant color determination unit 320.

The reference voltage setting unit 310 may set the reference voltage based on the luminance value Ti_L of the image displayed on the display unit. The reference voltage may be a voltage applied to the display unit 100 when the black image is displayed on the display unit.

The reference voltage setting unit 310 may transmit a voltage control signal V_CTRL to the display driver 200 to apply the test voltage V_Test to the display unit 100. The magnitude of the test voltage V_Test may a voltage that displays the black image. For example, the minimum value of the test voltage V_Test may be 5.1V and the maximum value thereof may be 6.3V.

The reference voltage setting unit 310 may receive the luminance value Ti_L of the test image displayed by the test voltage V_Test from the measurement device 500.

In one embodiment, the reference voltage setting unit 310 may determine a luminance value closest to the reference luminance among the received luminance values as the reference voltage. The reference luminance may be the luminance value of the black image displayed on the display unit. For example, the reference luminance may be 0.001 Nits.

In one embodiment, the reference voltage setting unit 310 may determine whether the luminance value Ti_L of the test image is less than or equal to the reference luminance. If the luminance value Ti_L is less than or equal to the reference luminance, the reference voltage setting unit 310 may set the test voltage V_Test corresponding to the luminance value Ti_L as the reference voltage. If the luminance value Ti_L is more than the reference luminance, the reference voltage setting unit 310 may change the magnitude of the test voltage V_Test. For example, it may reduce the magnitude of the test voltage V_Test by the reference value which may be altered by the user's settings.

The reference voltage setting unit 310 may receive the color coordinates CC of the test image displayed by the test voltage V_Test from the measurement device 500.

The reference voltage setting unit 310 may output the reference voltage and the test voltage V_Test, and the color coordinate CC corresponding to the test voltage V_Test to the dominant color determination unit 320.

The dominant color determination unit 320 may determine a color region corresponding to the test voltage V_Test based on the color coordinates CC received from the reference voltage setting unit 310 and the region data RD stored in the storage medium 400. For example, the dominant color determination unit 320 may determine a color region in the CIE 1931 color coordinate system depending on the color coordinate CC corresponding to the test voltage V_Test.

The dominant color determination unit 320 may set a weight to the test voltage V_Test depending on the magnitude of the reference voltage and the test voltage V_Test received from the reference voltage setting unit 310. The smaller the difference between the magnitudes of the reference voltage and the test voltage V_Test is, the higher the weight may be.

The dominant color determination unit 320 may generate a decision value for each color region based on the weight set to the test voltage V_Test. The dominant color determination unit 320 may determine the dominant color based on a color region with the largest decision value.

The dominant color determination unit 320 may set a margin voltage based on the determined dominant color and the margin voltage table TB stored in the storage medium 400. In one embodiment, the dominant color determination unit 320 may determine the magnitude of the margin voltage of the first color, the magnitude of the margin voltage of the second color, and the magnitude of the margin voltage of the third color based on the determined dominant color.

For example, the dominant color determination unit 320 may set only the magnitude of the margin voltage of the first color when the dominant color is the first color, may set only the magnitude of the margin voltage of the second color when the dominant color is the second color, and may set only the magnitude of the margin voltage of the third color when the dominant color is the third color.

In other words, the dominant color determination unit 320 may set the margin voltage for the color corresponding to the dominant color among the first to third colors and may not set the margin voltage for other colors. A more detailed description of this will be described later with reference to FIGS. 4 and 5.

The dominant color determination unit 320 may output the set margin voltage data V_mg to the display driver 200. The display driver 200 may add a margin voltage to a voltage for displaying the black image and output the resulting black image to the display unit 100.

Figure 5:
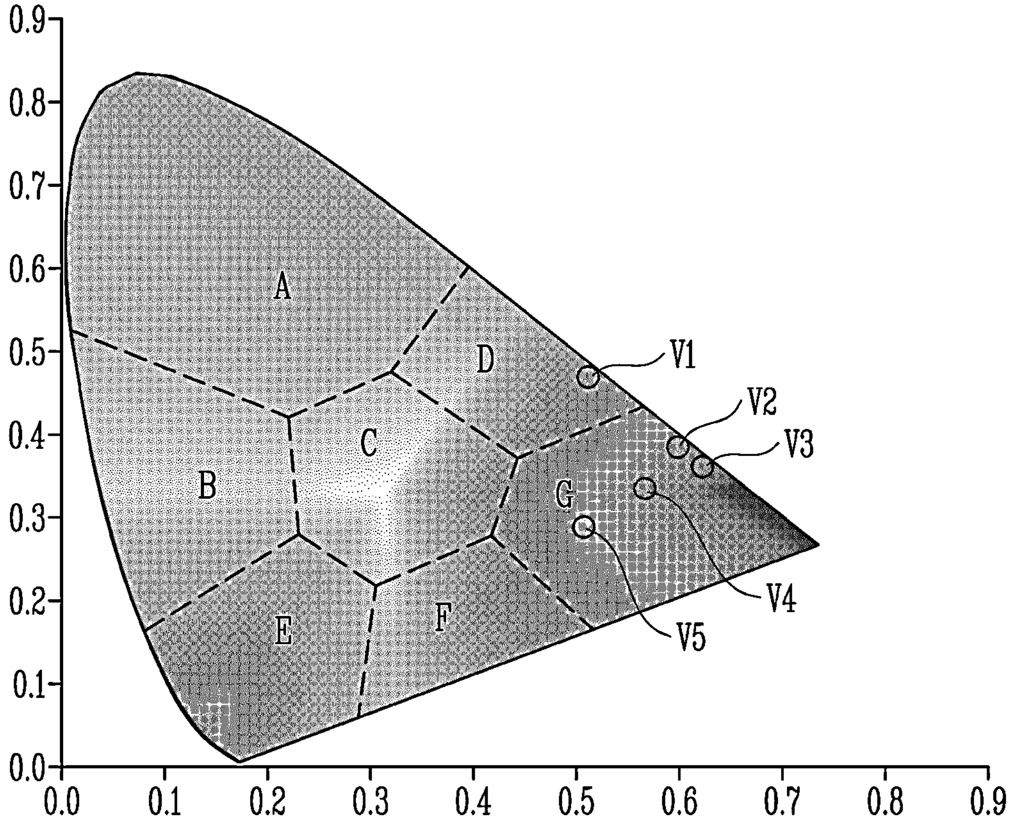
FIG. 5 is a drawing showing color coordinates of test voltages in color regions according to an embodiment of the present inventive concept.

FIG. 4 is a table illustrating factors determined by a dominant color determination unit according to an embodiment of the present inventive concept. FIG. 5 is a drawing showing color coordinates of test voltages in color regions according to an embodiment of the present inventive concept.

Referring to FIGS. 3 to 5 together, the operation of the dominant color determination unit 320 determining the color region in which each of the test voltages is disposed and determining the dominant color, can be described.

Hereinafter, the case where the reference luminance is set to 0.001 nits will be described as an example.

The dominant color determination unit 320 may receive the reference voltage, the first to fifth test voltages V1 to V5, and the color coordinates CC corresponding to the first to fifth test voltages V1 to V5 from the reference voltage setting unit 310. The first test voltage V1 may be 5.9V, the second test voltage V2 may be 5.8V, the third test voltage V3 may be 5.7V, the fourth test voltage V4 may be 5.6V, and the fifth test voltage V5 may be 5.5V. The fourth test voltage V4 having the luminance value closest to the reference luminance (0.001 nits) may be set as the reference voltage.

The dominant color determination unit 320 may determine the color region for the first to fifth test voltages V1 to V5 based on the region data RD stored in the storage medium 400. Referring to FIG. 5, the CIE 1931 color coordinate system including first to seventh regions A to G is shown. In one embodiment, the region data RD stored in the storage medium may be color coordinates that define each of the regions of the CIE 1931 color coordinate system shown in FIG. 5.

The dominant color of the first region A may be green. The dominant color of the second region B may be cyan. The third region C may not have a dominant color. The dominant color of the fourth region D may be yellow. The dominant color of the fifth region E may be blue. The dominant color of the sixth region F may be magenta. The dominant color of the seventh region G may be red.

The color region of the present inventive concept is not limited to FIG. 5, and the color coordinates defining each color region may change depending on the user's settings. Additionally, seven color regions are shown in FIG. 5, but the present inventive concept is not limited thereto and may include more than seven color regions depending on the user's settings.

The dominant color determination unit 320 may determine the color region in which each of the first to fifth test voltages V1 to V5 is disposed based on the color coordinates CC of each of the first to fifth test voltages V1 to V5. The color coordinates CC may include x-coordinates and y-coordinates. For example, referring to FIGS. 4 and 5, since the x-coordinate of the first test voltage V1 in the CIE 1931 color coordinate system is 0.5110 and the y-coordinate thereof is 0.4674, the color coordinate corresponding to the first test voltage V1 may be disposed in the fourth region D. Since of the second test voltage V2 in the CIE 1931 color coordinate system is 0.5999 and the y-coordinate thereof is 0.3839, the color coordinate corresponding to the second test voltage V2 may be disposed in the seventh region G.

The dominant color determination unit 320 may set a weight for each of the first to fifth test voltages V1 to V5. In one embodiment, the dominant color determination unit 320 may set the same weight for each of the first to fifth test voltages V1 to V5. For example, the dominant color determination unit 320 may set the weight of 0.2 for each of the first to fifth test voltages V1 to V5.

In one embodiment, the dominant color determination unit 320 may set weights for each of the first to fifth test voltages V1 to V5. The dominant color determination unit 320 may set a larger weight as the difference between the magnitudes of the test voltage and the reference voltage becomes smaller. For example, referring to FIG. 4, the dominant color determination unit 320 may set the weight of 0.2 for the second test voltage V2 having the difference of 0.2V from the fourth test voltage V4, which is the reference voltage, and may set the weight of 0.1 for the first test voltage V1 having the difference of 0.3V from the fourth test voltage V4.

Additionally, the dominant color determination unit 320 may set a larger weight for a test voltage having a magnitude larger than the reference voltage than a test voltage having a magnitude smaller than the reference voltage. For example, referring to FIG. 4, the third test voltage V3 and the fifth test voltage V5 have the same difference 0.1V from the reference voltage, but the dominant color determination unit 320 may set a weight of 0.3 for the third test voltage V3, and may set a weight of 0.1 for the fifth test voltage V5.

The dominant color determination unit 320 may generate a decision value by summing the weights of test voltages disposed in each color region. For example, when the second to fifth test voltages V2 to V5 are disposed in the seventh region G, the dominant color determination unit 320 may generate a decision value of the seventh region G by summing weights set for the second to fifth test voltages V2 to V5. The decision value of the seventh region G may be 0.9. In this way, the dominant color determination unit 320 may determine a decision value corresponding to each color region based on the color regions corresponding to the first to fifth test voltages V1 to V5.

When the first test voltage V1 is disposed in the fourth region D, the dominant color determination unit 320 may generate a decision value of the fourth region D based on the weight set for the first test voltage V1. The decision value of the fourth region D may be 0.1.

The dominant color determination unit 320 may set margin voltages for some of the first to third colors based on a margin voltage table TB stored in the storage medium 400 and a dominant color of the color region with the largest decision value among the first to seventh regions A to G.

Table 1 below may be a margin voltage table TB stored in the storage medium 400. Table 1 shows the magnitude of the margin voltage for the first color, the magnitude of the margin voltage for the second color, and the magnitude of the margin voltage for the third color set depending on the dominant color of the region with the largest decision value. The first color may be red, the second color may be green, and the third color may be blue in Table 1.

TABLE 1

| | Margin Voltage V | | |
|---|---|---|---|
| Color Region | First color | Second color | Third color |
| A | 0.0 | 0.3 | 0.0 |
| B | 0.0 | 0.3 | 0.3 |
| C | 0.3 | 0.3 | 0.3 |
| D | 0.3 | 0.3 | 0.0 |
| E | 0.0 | 0.0 | 0.3 |
| F | 0.3 | 0.0 | 0.3 |
| G | 0.3 | 0.0 | 0.0 |

Referring to Table 1, it can be seen that the magnitude of the margin voltage of the first color, the magnitude of the margin voltage of the second color, and the magnitude of the margin voltage of the third color are different depending on the color regions.

For example, referring to FIG. 4, the dominant color determination unit 320 may set a margin voltage for red based on the dominant color of the seventh region G with the largest decision value being red.

More specifically, when the region with the largest decision value is the seventh region G, the dominant color is red. The dominant color determination unit 320 sets the margin voltage of 0.3V for the first color with reference to the seventh region G of Table 1. The dominant color determination unit 320 does not set the margin voltage for the second color and the third color or sets the margin voltage to 0V.

When the region with the largest decision value is the fourth region D, the dominant color is yellow. The dominant color determination unit 320 sets the margin voltage of 0.3V for the first color and the second color with reference to the fourth region D of Table 1. The dominant color determination unit 320 does not set the margin voltage for the third color or sets the margin voltage to 0V.

In this way, the dominant color of the black image can be determined, and the margin voltage can be selectively set for only some of the first to third colors depending on the determined dominant color. For colors for which margin setting is unnecessary, the margin voltage may not be set or may be set to 0V. In this case, power consumed when displaying the black image may be reduced compared to when the margin voltage is uniformly set to be the same for the first to third colors.

Figure 6:
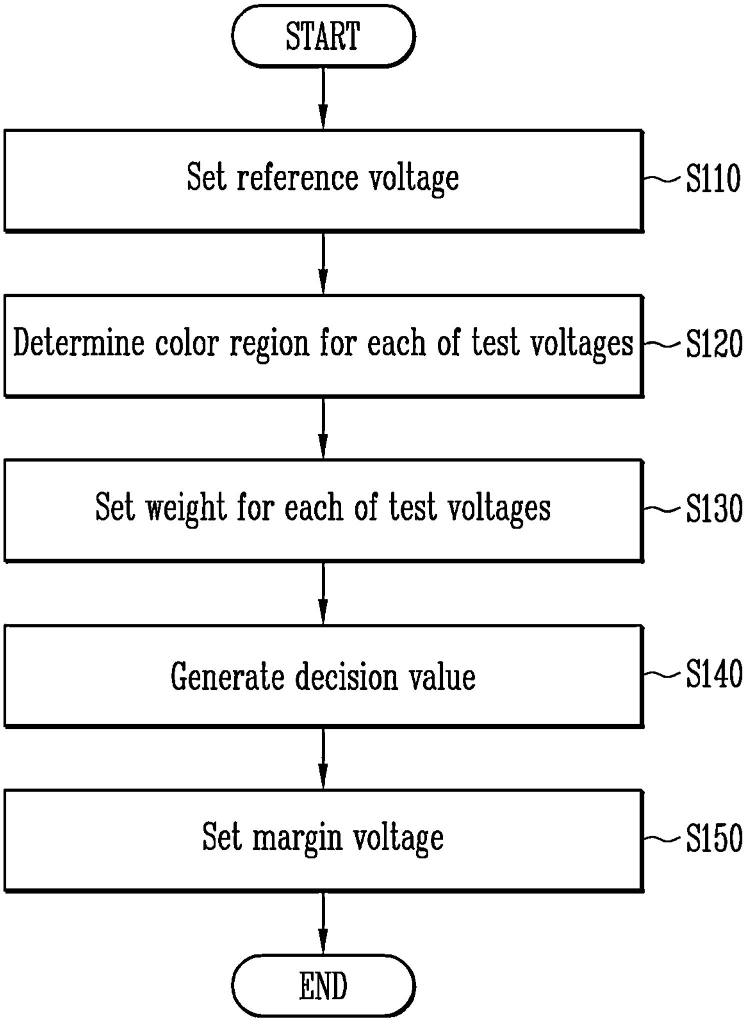
FIG. 6 is a flowchart showing an operation of a margin voltage setting unit according to an embodiment of the present inventive concept.

FIG. 6 is a flowchart showing an operation of a margin voltage setting unit according to an embodiment of the present inventive concept.

Referring to FIGS. 3 and 6, a method by which the margin voltage setting unit 300 sets the margin voltage is shown. The margin voltage setting unit 300 may correspond to the margin voltage setting unit 300 of FIG. 3.

In step S110, the margin voltage setting unit 300 may control the display driver 200 to apply a test voltage to the display unit 100 and may set a reference voltage based on the luminance value measured by the measurement device 500. In one embodiment, the margin voltage setting unit 300 may control the display driver 200 to apply each of a plurality of test voltages to the display unit 100 and may set a test voltage corresponding to the luminance value closest to the reference luminance among the measured luminance values as the reference voltage.

In step S120, the margin voltage setting unit 300 may determine a color region for each of the test voltages. The margin voltage setting unit 300 may calculate the color coordinates of each of the test voltages in the CIE 1931 color coordinate system and may determine in which region of the first to seventh regions of the CIE 1931 color coordinate system each of the test voltages is disposed.

In step S130, the margin voltage setting unit 300 may set a weight for each of the test voltages. In one embodiment, the margin voltage setting unit 300 may set the same weight for each of the test voltages. In one embodiment, the margin voltage setting unit 300 may set a weight for each of the test voltages. For example, the smaller the difference between magnitudes of the test voltage and the reference voltage, the larger the weight may be set to the test voltage.

In step S140, the margin voltage setting unit 300 may generate a decision value by summing the weights of the test voltages disposed in each of the color regions.

In step S150, the margin voltage setting unit 300 may set a margin voltage based on the dominant color of the region with the largest decision value. The margin voltage setting unit 300 may individually set the magnitude of the margin voltage for the first color, the magnitude of the margin voltage for the second color, and the magnitude of the margin voltage for the third color based on the dominant color.

The technical scope of the present disclosure may be determined by on the technical scope of the accompanying claims. All changes or modifications that come within the meaning and range of the claims and their equivalents will be interpreted as including the range of the present inventive concept.

What is claimed is:

1. A display device comprising: a display unit including pixels displaying a first color, a second color and a third color; a data driver that supplies a plurality of test voltages to the pixels in the display unit through data lines to display test images through the display unit; and a margin voltage setting unit that determines a dominant color based on the test images displayed on the display unit and individually sets margin voltages corresponding to the first color, the second color and the third color based on the dominant color.

2. The display device of claim 1, wherein the margin voltage setting unit sets only the margin voltage of the first color when the dominant color is the first color, sets only the margin voltage of the second color when the dominant color is the second color, and sets only the margin voltage of the third color when the dominant color is the third color.

3. The display device of claim 1, wherein the margin voltage setting unit determines color regions corresponding to the plurality of test voltages among a plurality of color regions, generates decision values corresponding to the plurality of color regions respectively based on the determined color regions, and determines the dominant color based on a color region with a largest decision value among the decision values.

4. The display device of claim 3, wherein the margin voltage setting unit sets a weight for each of the plurality of test voltages, and generates the decision values by summing weights of test voltages disposed in each of the plurality of color regions.

5. The display device of claim 3, wherein the margin voltage setting unit sets a weight for each of the plurality of test voltages, and sets a largest weight for a reference voltage among the plurality of test voltages.

6. The display device of claim 5, wherein the margin voltage setting unit sets a larger weight as a difference between each of the plurality of test voltages and a reference voltage becomes smaller.

7. The display device of claim 5, wherein the margin voltage setting unit sets a test voltage having a luminance value closest to reference luminance as the reference voltage.

8. The display device of claim 3, wherein the margin voltage setting unit sets a same weight for each of the plurality of test voltages.

9. The display device of claim 3, wherein the plurality of color regions are regions in a CIE 1931 color coordinate system.

10. The display device of claim 1, wherein each of the plurality of test voltages is a voltage set to display a black image on the display device.

11. A method of operating a display device including pixels displaying a first color, a second color and a third color comprising:

displaying test images through the pixels by supplying a plurality of test voltages to the pixels;

determining color regions respectively corresponding to a plurality of test voltages among a plurality of color regions depending on the test images;

generating decision values corresponding to the plurality of color regions respectively based on the determined color regions;

determining a dominant color based on a color region having a largest decision value among the decision values; and setting a margin voltage based on the dominant color.

12. The method of claim 11, wherein the setting the margin voltage based on the dominant color includes setting each of a margin voltage of the first color, a margin voltage of the second color, and a margin voltage of the third color based on the dominant color.

13. The method of claim 12, wherein, when the dominant color is the first color, only the margin voltage of the first color is set, when the dominant color is the second color, only the margin voltage of the second color is set, and, when the dominant color is the third color, only the margin voltage of the third color is set.

14. The method of claim 11, wherein the generating the decision values corresponding to the plurality of color regions respectively includes:

setting a weight for each of the plurality of test voltages; and summing weights of test voltages disposed in each of the plurality of color regions.

15. The method of claim 14, wherein the setting the weight for each of the plurality of test voltages includes setting a weight for each of the plurality of test voltages.

16. The method of claim 15, wherein the setting the different weight for each of the plurality of test voltages includes setting a larger weight as a difference between each of the plurality of test voltages and a reference voltage is smaller.

17. The method of claim 16, further comprising:

receiving luminance values corresponding to the plurality of test voltages respectively; and setting a test voltage having a luminance value closest to reference luminance as the reference voltage.

18. The method of claim 11, wherein setting the weight for each of the plurality of test voltages includes setting a same weight for each of the plurality of test voltages.

19. The method of claim 11, wherein the plurality of color regions are regions in a CIE 1931 color coordinate system.

20. The method of claim 11, wherein each of the plurality of test voltages is a voltage set to display a black image on the display device.

* * * * *